(12) United States Patent
Takayama

(10) Patent No.: US 8,089,525 B2
(45) Date of Patent: Jan. 3, 2012

(54) WHITE BALANCE CONTROL DEVICE AND WHITE BALANCE CONTROL METHOD

(75) Inventor: Masahiro Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 12/331,854

(22) Filed: Dec. 10, 2008

(65) Prior Publication Data

US 2009/0167892 A1 Jul. 2, 2009

(30) Foreign Application Priority Data

Dec. 27, 2007 (JP) ................................. 2007-337664

(51) Int. Cl.
*H04N 5/228* (2006.01)
*G06K 9/46* (2006.01)
(52) U.S. Cl. .................................................. 348/222.1
(58) Field of Classification Search ................. 382/274, 382/162; 348/223.1
See application file for complete search history.

(56) References Cited

U.S. PATENT DOCUMENTS

| | | | | |
|---|---|---|---|---|
| 2006/0284991 | A1* | 12/2006 | Ikeda .......................... | 348/223.1 |
| 2008/0211925 | A1* | 9/2008 | Misawa et al. ............. | 348/223.1 |
| 2009/0002519 | A1* | 1/2009 | Nakamura .................. | 348/223.1 |
| 2009/0021602 | A1* | 1/2009 | Fujiwara et al. ............ | 348/223.1 |
| 2010/0208099 | A1* | 8/2010 | Nomura ....................... | 348/223.1 |

FOREIGN PATENT DOCUMENTS

| | | |
|---|---|---|
| JP | 2002-251380 | 9/2002 |
| JP | 2003-189325 | 7/2003 |

* cited by examiner

*Primary Examiner* — David Ometz
*Assistant Examiner* — Fayez Bhuiyan
(74) *Attorney, Agent, or Firm* — Cowan, Liebowitz & Latman, P.C.

(57) ABSTRACT

A first white balance correction value is computed by detecting white pixels from an image. A determination is made as to whether or not a corrected image signal in the face region falls into a second color signal region surrounding a first color signal region that represents a skin color if white balance of the image signal in the face region is corrected based on the first white balance correction value. When it is determined that the corrected image signal of the face region falls into the second color signal region, a second white balance correction value for correcting the image signal is computed based on relationships between the corrected image signal of face region and the first color signal region. The computed second white balance correction value is modified based on information obtained when the image was captured.

8 Claims, 11 Drawing Sheets

FIG. 14

| DisCx | ΔCx |
|---|---|
| 0 | 0 |
| 10 | 0 |
| 20 | 0 |
| 30 | 5 |
| 40 | 10 |
| 50 | 14 |
| ... | ... |
| 2000 | 0 |

| DisCy | ΔCy |
|---|---|
| 0 | 0 |
| 10 | 0 |
| 20 | 3 |
| 30 | 6 |
| 40 | 11 |
| 50 | 16 |
| ... | ... |
| 1000 | 0 |

WHITE BALANCE CONTROL DEVICE AND WHITE BALANCE CONTROL METHOD

BACKGROUND OF THE INVENTION

1. Field of the Invention

The present invention relates to a white balance control device and a white balance control method, and more particularly to a white balance control device and a white balance control method that controls the white balance of an image based on the luminance and color-difference signal of the image.

2. Description of the Related Art

Image-capturing apparatuses using an image sensor, such as digital cameras and digital video cameras, have a white balance control function for adjusting the color tone of a captured image. The white balance control is processing for correcting pixel values based on a white balance coefficient (correction value) so as to capture an image of a white object as white.

The white balance control includes manual white balance control in which an image of an object that is desired to be captured as white is captured and then a white balance coefficient is obtained, and automatic white balance control in which a captured image is automatically detected for portions that are assumed to be white and then the white balance coefficient is obtained.

Conventional automatic white balance control is described in the following.

Signals output from an image sensor are digitized by A/D conversion, and as shown in FIG. 2, divided into a plurality of blocks.

Each block is composed of a color pixel of R, G, or B, and color evaluation values ($Cx[i]$, $Cy[i]$) are obtained for each block, for example, by the computation formula (1) below.

$$Cx[i]=(R[i]-B[i])/Y[i]\times 1024$$

$$Cy[i]=(R[i]+B[i]-2G[i])/Y[i]\times 1024 \quad (1)$$

(where "i" is a block number; $R[i]$, $G[i]$, and $B[i]$ are average values of the RGB pixel contained in the block "i"; and $Y[i]=R[i]+2G[i]+B[i]$)

When a white detection region that is set in advance includes the color evaluation values ($Cx[i]$, $Cy[i]$), it is determined that the block is white. Then, integral values SumR, SumG, and SumB of the color pixel contained in the block are computed, and white balance coefficients (WBCo_R, WBCo_G, and WBCo_B) are computed using the formula (2) below.

$$WBCo\_R=SumY\times 1024/sumR$$

$$WBCo\_G=SumY\times 1024/sumG$$

$$WBCo\_B=SumY\times 1024/sumB \quad (2)$$

where SumY=(sumR+2×sumG+SumB)/4

However, in such white balance control, there are the following problems.

Under sunlight, the color evaluation value of white is distributed in the proximity of region A in FIG. 3. The color evaluation value of skin color under sunlight is distributed in region B, that is, a region that is substantially equivalent to the color evaluation value of the white point under a light source having a low color temperature.

Thus, in the case of an image containing less white color and more skin color, as in an up-close portrait, the color evaluation value obtained by using the aforementioned formula falls in region B in FIG. 3. As a result, there is a problem in that the skin color was mistakenly determined as white under a light source having a low color temperature, and a white balance coefficient for correcting the skin color to white is computed, leading to a miscorrection of human skin color to white. Similarly, in an image containing more chromatic colors that are close to the skin color, the chromatic colors are sometimes mistakenly determined as white, thereby mistakenly correcting the skin color to white.

For such a problem, when the luminance of a photographic subject is high, it is determined that the subject is under daylight (sunlight), and the region to be detected as white color (white detection region) is narrowed in order to not mistakenly determine the skin color as a white color under a light source having a low color temperature. However, when using low-illuminance fluorescent light having a high color temperature or fluorescent light having a medium color temperature as an indoor light source, the skin color is distributed below the black body radiation line (FIG. 3, region C). Therefore, in order to carry out the automatic white balance control for such fluorescent light, it is necessary to expand the white detection region, and there are cases where skin color is mistakenly determined as white.

Thus, Japanese Patent Laid-Open No. 2003-189325 proposes using a face detection technique to exclude the region detected as the face (face region) from the detection target of the white color pixel when carrying out white balance control.

However, in the white balance control method of Japanese Patent Laid-Open No. 2003-189325, there is no strategy for dealing with cases where the face region is wrongly detected, or cases where the face region cannot be detected. Thus, there is a problem in that when a region that is not a human face is incorrectly detected as a face region, the target region of white detection becomes smaller than necessary, leading to a decrease in the accuracy in color temperature information to be obtained and a further decrease in the accuracy in the white balance control.

Also, there is a problem in that when an up-close image of a human face is captured, or when many faces are included as in a group photo, the white detection target region becomes extremely small, decreasing accuracy in the white balance control.

SUMMARY OF THE INVENTION

The present invention has been conceived in light of these problems with the conventional techniques, and provides a white balance control device and control method which realizes a highly accurate white balance correction.

According to an aspect of the present invention, there is provided a white balance control device that controls the white balance of an image obtained by image-capturing, the device comprising: a first computing unit that computes a first white balance correction value by detecting white pixels from the image; a face detection unit that detects a face region from the image; a determination unit that determines, if the white balance of an image signal in the face region detected by the face detection unit is corrected based on the first white balance correction value, whether the corrected image signal in the face region falls into a second color signal region surrounding a first color signal region representing a skin color; a second computing unit that computes, if the determination unit determines that the corrected image signal falls into the second color signal region, a second white balance correction value for correcting the white balance of the image based on a relationship between the corrected image signal of the face region and the first color signal region; and a modification unit that modifies, according to information obtained when the image was captured, the second white balance correction value computed by the second computing unit.

According to another aspect of the present invention, there is provided a white balance control method for controlling white balance of an image obtained by image-capturing, the method comprising: a first computing step of computing a first white balance correction value by detecting white pixels from the image; a face detection step of detecting a face region from the image; a determination step of determining, if the white balance of an image signal in the face region detected in the face detection step is corrected based on the first white balance correction value, whether the corrected image signal in the face region falls into a second color signal region surrounding a first color signal region that represents a skin color; a second computing step of computing, if it is determined in the determination step that the corrected image signal falls into the second color signal region, a second white balance correction value for correcting the image based on relationships between the corrected image signal in the face region and the first color signal region; and a modification step of modifying, according to information obtained when the image was captured, the second white balance correction value computed in the second computing step.

Further features of the present invention will become apparent from the following description of exemplary embodiments with reference to the attached drawings.

BRIEF DESCRIPTION OF THE DRAWINGS

FIG. 14 is a diagram illustrating another example of correspondence information of a distance-correction value contained in the white balance control unit 103 according to the second embodiment of the present invention.

DESCRIPTION OF THE EMBODIMENTS

Preferred embodiments of the present invention will now be described in detail in accordance with the accompanying drawings.

First Embodiment

Figure 1:
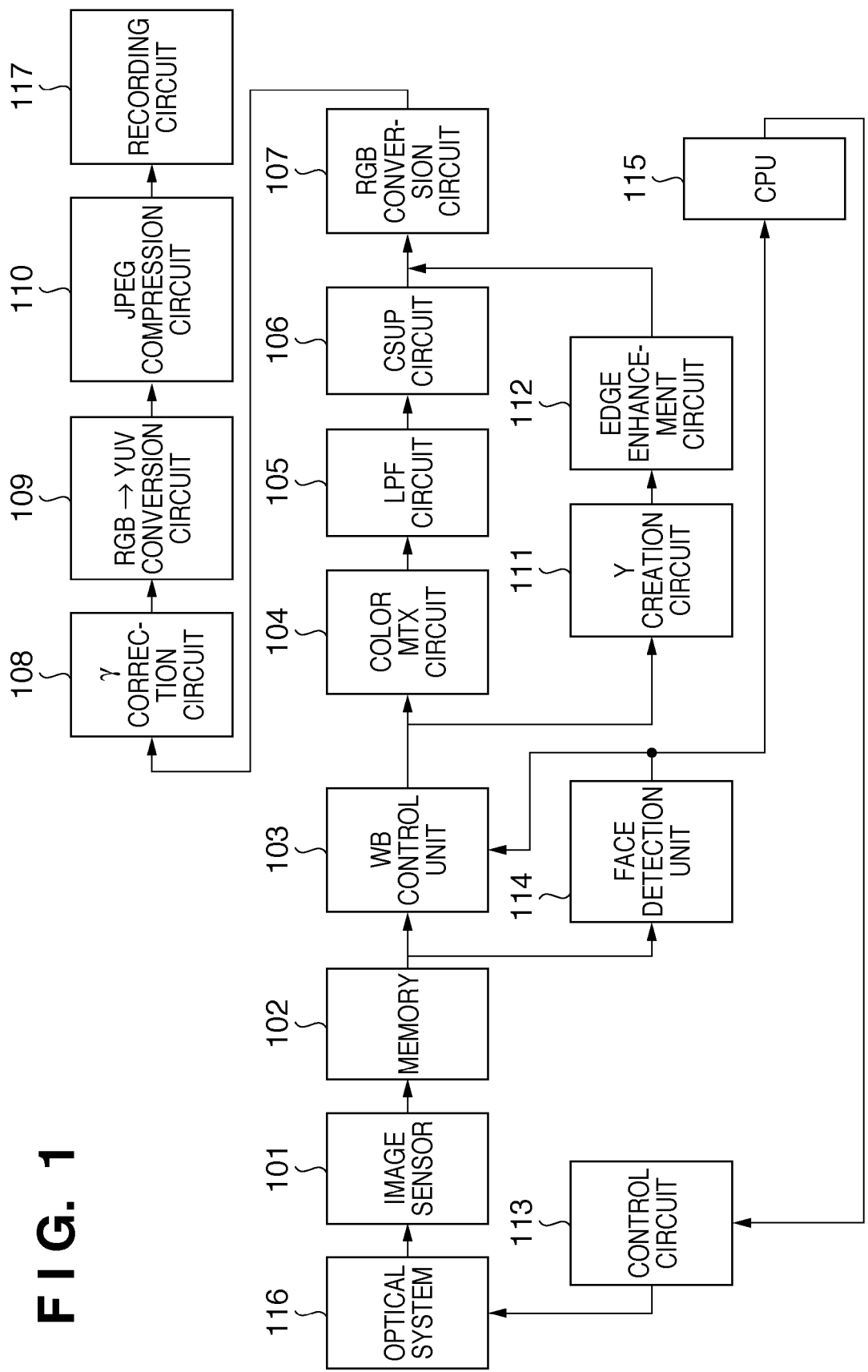
FIG. 1 is a block diagram illustrating an example of the functional configuration of an image-capturing apparatus to which a white balance control device according to a first embodiment of the present invention can be applied.

FIG. 1 is a block diagram illustrating an example of a functional configuration of an image-capturing apparatus to which a white balance control device according to a first embodiment of the present invention can be applied.

In FIG. 1, an optical system 116 includes an aperture, a mechanical shutter, a lens, and so on, and an optical image of a photographic subject is formed on an image sensor 101 according to control performed by the control circuit. The image sensor 101 is a solid state image sensor such as a CCD image sensor, a CMOS image sensor, or the like, including, for example, the Bayer color filter array of primary colors, and is capable of capturing a color image. In this embodiment, the image sensor 101 includes preprocessing circuits such as an A/D converter, and a memory 102 stores image data of the captured image.

A face detection unit 114 applies a known face detection technique to the image data stored in the memory 102, and detects a human face region contained in the image. The known face detection technique includes a learning-based method using a neural network, a method using template matching to search parts having a characteristic shape such as the eyes, nose, and mouth from the image and when similarities are found, it is determined to be a face. Many other methods have also been proposed, including a method in which the image feature amount such as the skin color and the shape of the eyes is detected and statistical analysis is used. Generally, accuracy in face detection is improved by using these methods in combination.

Specific examples include a face detection method that uses wavelet transforms and an image feature amount, described in Japanese Patent Laid-Open No. 2002-251380.

Pattern recognition using template matching is briefly described below. Pattern recognition is processing by which an observed pattern is matched with a concept (class) set in advance.

Figure 4:
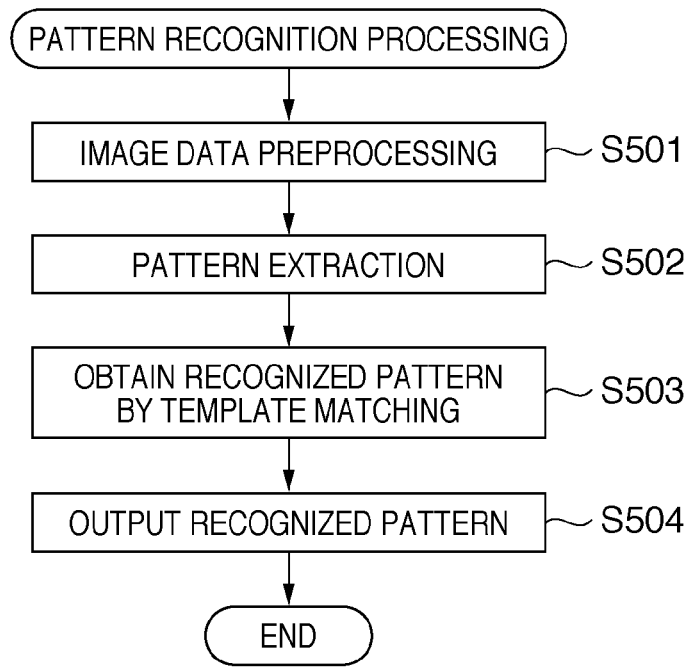
FIG. 4 is a flowchart illustrating an example of pattern recognition processing carried out by a face detection unit 114 in FIG. 1.

FIG. 4 is a flowchart illustrating an example of pattern recognition processing carried out by the face detection unit 114 in FIG. 1.

First, the face detection unit 114 preprocesses the image data obtained from the memory 102 (S501). The preprocessing includes, for example, creation of luminance information used when extracting image characteristics.

Then, the face detection unit 114 extracts a region (pattern) having the predetermined image characteristics from the preprocessed image data (S502). Next, the face detection unit 114 compares the extracted pattern with templates (standard patterns) 601 prepared in advance (template matching). Then, when, for example, correlations of a certain level or greater are found with the templates, the extracted pattern is recognized as a pattern that matches the template (S503). Furthermore, the face detection unit 114 outputs information that specifies the recognized pattern (S504), and terminates the pattern recognition processing.

An example of the template matching that can be carried out by the face detection unit 114 in S503 will now be described with reference to FIG. 5.

Figure 5:
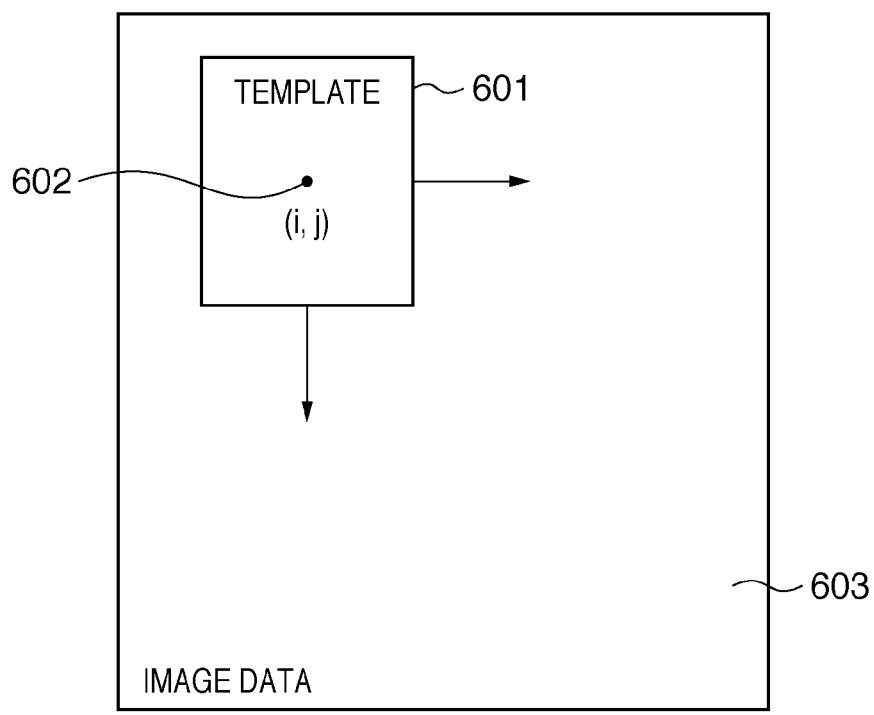
FIG. 5 is a diagram illustrating an example of template matching that can be carried out by the face detection unit 114 in S503 of FIG. 4.

In FIG. 5, it is assumed that the face detection unit 114 has obtained image data 603 from the memory 102.

First, a center point 602 of a template 601 stored in the face detection unit 114 in advance is matched with a coordinate point (i, j) of the image data 603 obtained from the memory 102. Then, the degree of similarity is computed between the template 601, and a region of the image data 603 that overlaps with the template 601. This computing operation for the degree of similarity is carried out for the entirety of the image data 603 while shifting the center point 602 of the template 601, and the position of the center point 602 where the greatest degree of similarity is achieved is searched. When the position of the center point 602 where the degree of similarity is greater than or equal to a predetermined threshold is detected, the region of the portion corresponding to the template 601 can be recognized as having a pattern similar to the template 601.

Thus, the position of the eyes and the position of the face region (face coordinates) contained in the image data 603 can be detected, for example, by using the templates 601 corresponding to the shapes of the eyes and ears. When the face region is detected, the face detection unit 114 outputs information on the position, size, and so on of the face region as face information.

When the face region is detected by the face detection unit 114, a CPU 115 calculates a shutter speed and an aperture value so that the image of the face region is captured with a correct exposure. The CPU 115 also controls focusing, setting the face region as a focus detection region, and calculates the amount by which the focus lens is to be driven.

On the other hand, when the face region is not detected by the face detection unit 114, the CPU 115 calculates the shutter speed and the aperture value based on the luminance of the entire image, and controls focusing by using the preset focusing region, and then calculates the amount by which the focus lens is to be driven.

The exposure values (shutter speed, aperture value) calculated by the CPU 115 and the amount by which the focus lens is to be driven are sent to a control circuit 113. The control circuit 113 drives the aperture, the shutter, and the focus lens of the optical system 116 based on these values.

A white balance (WB) control unit 103 computes a white balance (WB) correction value based on the image data stored in the memory 102, and the face information obtained from the face detection unit 114. Then, the WB control unit 103 corrects the white balance of the image data stored in the memory 102 by using the computed WB correction value. The detailed configuration of the WB control unit 103 and the computation method of the WB correction value are to be mentioned later.

In a color matrix (MTX) circuit 104, a color gain is multiplied, and a conversion is made into two color-difference signal data R-Y and B-Y in order to reproduce with optimum colors the image data whose WB corrected by the WB control unit 103. A low pass filter (LPF) circuit 105 limits a band of color-difference signal data R-Y and B-Y. A CSUP (Chroma Suppress) circuit 106 suppresses the false color signal of the saturated portion of the color-difference signal data whose band was limited in the LPF circuit 105.

Meanwhile, the image data whose white balance is corrected by the WB control unit 103 is also supplied to a luminance signal (Y) creation circuit 111, and the luminance signal creation circuit 111 creates luminance signal data Y. An edge enhancement circuit 112 applies edge enhancement processing to the created luminance signal data Y.

The color-difference signal data R-Y and B-Y output from the CSUP circuit 106 and the luminance signal data Y output from the edge enhancement circuit 112 are converted to RGB signal data by an RGB conversion circuit 107. A gamma correction circuit 108 applies tone correction based on preset $\gamma$ characteristics to the RGB signal data. After the gamma-corrected RGB signal data is converted into YUV signal data by a RGB-YUV conversion circuit 109, the data is compressed and encoded by a JPEG compression circuit 110, and then stored in a recording medium as an image data file by a recording circuit 117. The recording medium may be a removable type or a built-in type.

Figure 6:
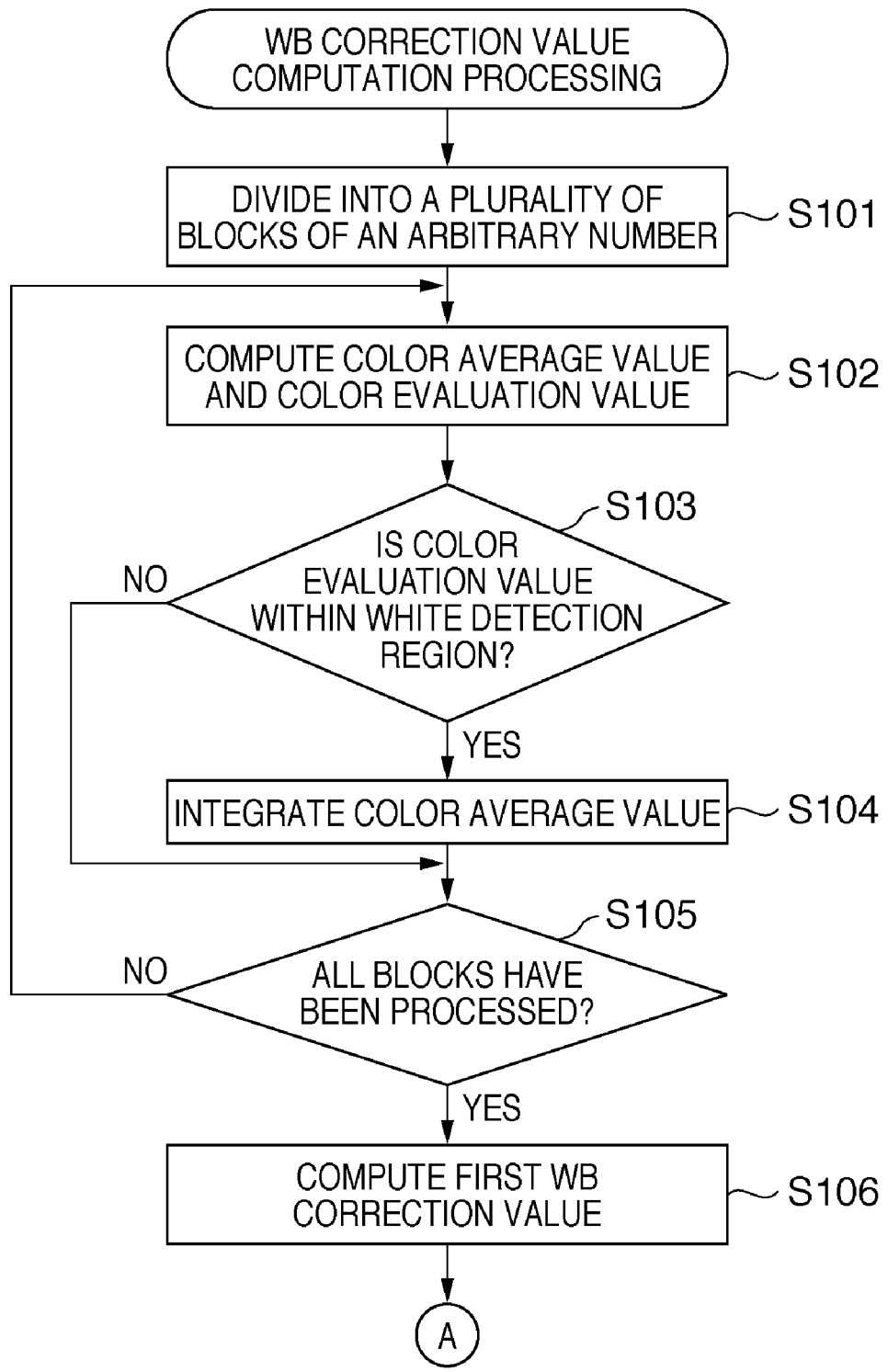
FIG. 6 and FIG. 7 are flowcharts illustrating an operation for computing the white balance correction value carried out by a white balance control unit 103 according to the first embodiment of the present invention.
Figure 7:
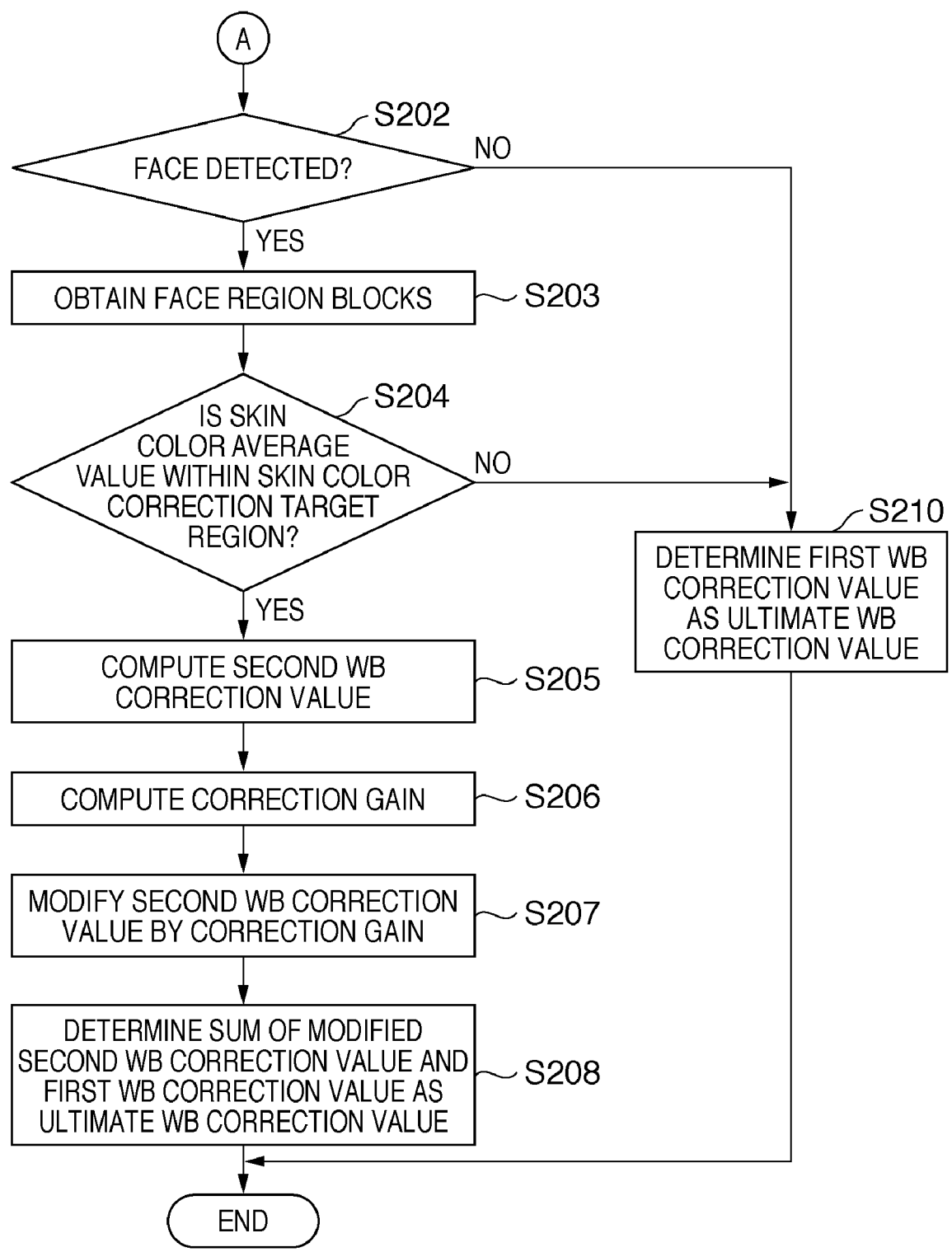

FIG. 6 and FIG. 7 are flowcharts illustrating a computing operation of the WB correction value carried out by the WB control unit 103.

FIG. 6 illustrates an operation of the WB control unit 103 as a first correction value computing means, and FIG. 7 illustrates an operation of the WB control unit 103 as a second correction value computing means.

Figure 2:
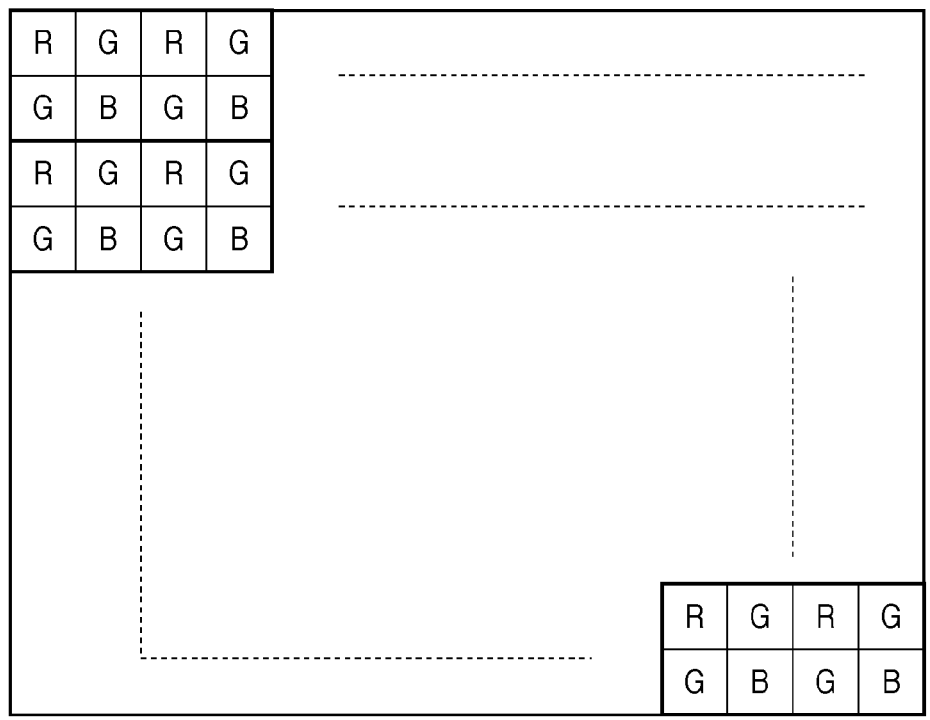
FIG. 2 is a diagram illustrating an example of a picture division carried out at the time of computing the white balance correction value in an embodiment of the present invention.

First, the WB control unit 103 reads out image data of one picture (frame or field) stored in the memory 102, and divides it into blocks of an arbitrary number "m" (m is an integer greater than or equal to one) as shown in FIG. 2 (S101).

Then, the WB control unit 103 computes color average values (R[i], G[i], B[i]) by averaging the pixel value contained in the block for each color component, and further computes color evaluation values (Cx[i], Cy[i]) for each block by using the formula (1) (S102).

$$Cx[i]=(R[i]-B[i])/Y[i]\times 1024$$

$$Cy[i]=(R[i]+B[i]-2G[i])/Y[i]\times 1024$$

where Y[i]=R[i]+2G[i]+B[i], i=1 ... m

Figure 3:
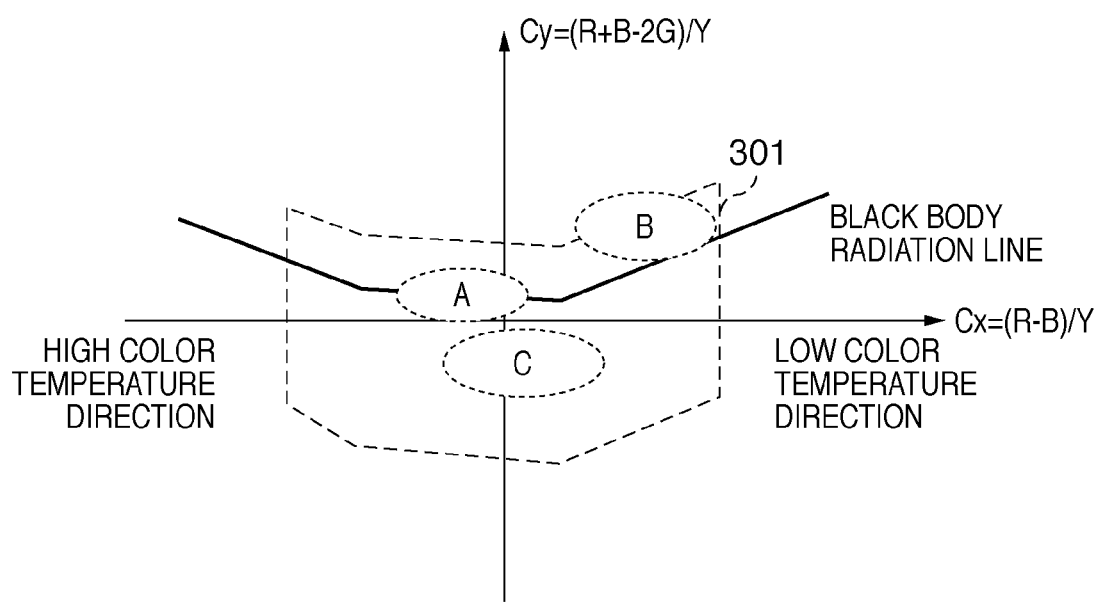
FIG. 3 is a diagram illustrating an example of a white detection region of the color evaluation value in an embodiment of the present invention.

Then, the WB control unit 103 determines whether or not the color evaluation values (Cx[i], Cy[i]) of the block number "i" computed in S102 is included in a preset white detection region 301 shown in FIG. 3 (S103).

The white detection region 301 is a plotted color evaluation value that is computed by taking an image of a white color object under light sources having different characteristics (for example, color temperature).

With respect to x-axis (Cx) in FIG. 3, the color evaluation values when taking an image of a white color object under a light source having a high temperature are distributed in the negative region, and the color evaluation values when taking an image of a white color object under a light source having a low color temperature are distributed in the positive region. The y-axis (Cy) represents the degree of green (G) component in the light source, and the G component increases in the negative direction thereof. That is, when the light source is fluorescent light, the color evaluation values are distributed in the negative region of the y-axis.

When the computed color evaluation values (Cx[i], Cy[i]) are included in the white detection region 301 (YES in S103), the WB control unit 103 determines that the block has a white color. Then, the WB control unit 103 integrates the color average values (R[i], G[i], B[i]) of the block that is determined as white color (S104). On the other hand, when the color evaluation values (Cx[i], Cy[i]) are not included in the white detection region 301, the WB control unit 103 moves the processing to S105 without integrating the color average value of the block.

The processing in S103 and S104 can be expressed by the following formula (3).

$$SumR = \sum_{i=1}^{m} Sw[i] \times R[i]$$

$$SumG = \sum_{i=1}^{m} Sw[i] \times G[i]$$

$$SumB = \sum_{i=1}^{m} Sw[i] \times B[i] \qquad (3)$$

In the formula (3), when the color evaluation values (Cx[i], Cy[i]) are included in the white detection region (301 in FIG. 3), Sw[i] is set to 1, and when not included, Sw[i] is set to 0. In this way, only the color average values (R[i], G[i], B[i]) of the blocks whose color evaluation values (Cx[i], Cy[i]) are included in the white detection region (301 in FIG. 3) are integrated.

In S105, the WB control unit 103 determines whether or not processing of S102 to S104 has been carried out for all of the blocks. When there is a block that has not undergone processing, processing moves back to S102, and when all the blocks have undergone processing, processing moves to S106.

In S106, the WB control unit 103 computes first WB correction values (WBCol_R, WBCol_G, WBCol_B) from the obtained integral values (sumR, SumG, SumB) of the color average values using the following formula (4).

$WBCol\_R = sumY \times 1024/sumR$ $WBCol\_G = sumY \times 1024/sumG$ $WBCol\_B = sumY \times 1024/sumB \qquad (4)$ where sumY=(sumR+2×sumG+sumB)/4

Now, referring to FIG. 7, in S202, the WB control unit 103 determines whether or not the face detection unit 114 has detected a face (face region). When a face is not detected, it is determined that the already-computed first WB correction value is the ultimate WB correction value (S210), and the WB correction value computation processing is terminated.

On the other hand, when a face is detected, the WB control unit 103 obtains, in S203, color average values (FR, FG, FB) of the whole blocks corresponding to the face region. When the face region is not detected in block units, the blocks that are included in the face region by a predetermined proportion (for example, 50% or more) may also be included as the blocks that correspond to the face region, in addition to the blocks that are entirely included in the face region.

Then, in S204, the WB control unit 103 obtains skin color average values by multiplying the color average values (FR, FG, FB) obtained in S203 by the first WB correction values (WBCol_R, WBCol_G, WBCol_B), respectively. The skin color average value is the color average value of the face region corrected by the first WB correction value, that is, correction image signal data.

That is, the skin color average values (SR, SG, SB) are obtained by the following.

$SR = FR \times WBCol\_R$ $SG = FG \times WBCol\_G$ $SB = FB \times WBCol\_B$

Figure 8:
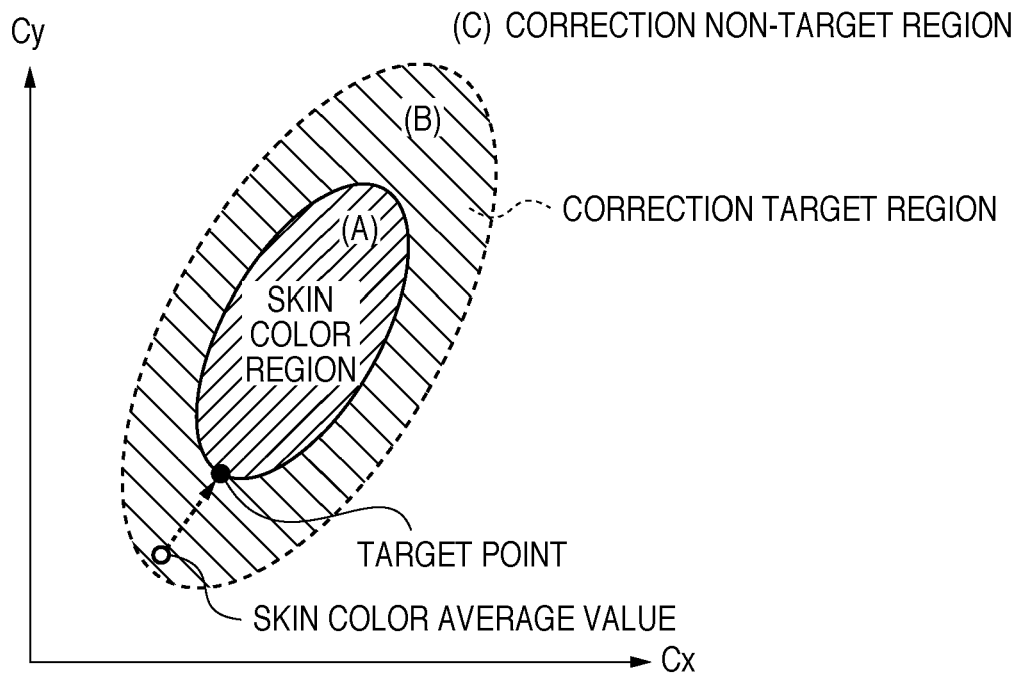
FIG. 8 is a diagram illustrating an example of a skin color region to which the white balance control unit 103 according to the first embodiment of the present invention refers.

Then, the WB control unit 103 determines whether or not the skin color average values (SR, SG, SB) are in the region (region (B) in FIG. 8) to which the skin color correction is to be applied.

In FIG. 8, a skin color region (A) corresponds to the first color signal region, and a skin color correction target region (B) corresponds to the second color signal region that is surrounding the skin color region (A) and is a region where the difference from the first color signal region is within a predetermined range. Because the Cx, Cy coordinate system is used as a predetermined color space coordinate system in FIG. 8, the determination is made after converting RGB data to color-difference signals, that is, Cx=SR−SB and Cy=SR+SB−2SG. It goes without saying that the determination can be made by using an arbitrary color space, applying a known color space conversion method.

The skin color region (A) and the skin color correction target region (B) shown in FIG. 8 can be set, for example, by capturing a plurality of images having a skin color under white light such as sunlight (daylight) in advance and using a statistical method. Information specifying the skin color region (A) and the skin color correction target region (B) may be stored in the WB control unit 103 in advance, or may be stored in a different storage device for the WB control unit 103 to refer to when necessary.

When the skin color average value is within skin color region (A) of FIG. 8, it can be determined that the white balance of the skin color has been appropriately corrected by the first WB correction value, and therefore the WB control unit 103 determines that the first WB correction value is the WB correction value ultimately used (S210).

When the skin color average value is in the skin color correction non-target region (C), the WB control unit 103 judges that the skin color average value does not represent human skin, and determines that the first WB correction value is the WB correction value ultimately used (S210).

On the other hand, when the skin color average value is in the skin color correction target region (B), it can be judged that the white balance of the skin color was not corrected appropriately by the first WB correction value. Therefore, the WB control unit 103 computes a second WB correction value that corrects differences between the skin color average value and skin color region (A) (S205).

Figure 9:
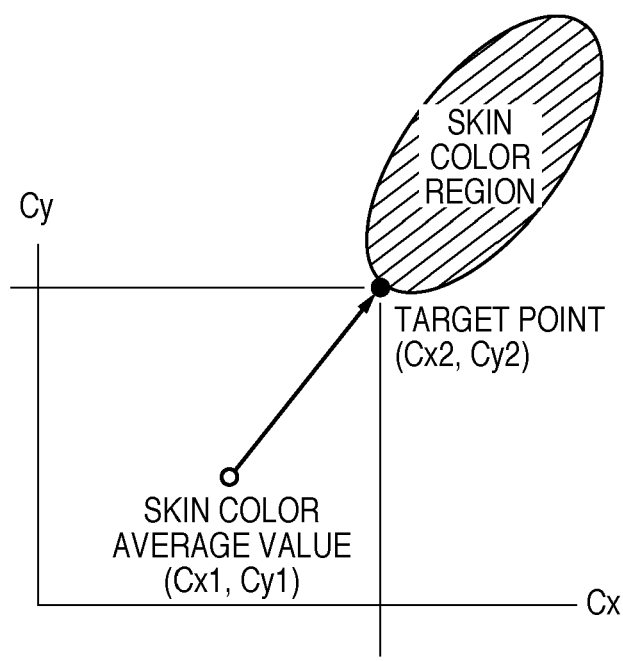
FIG. 9 is a diagram illustrating a correction amount based on a second white balance correction value computed by the white balance control unit 103 according to the first embodiment of the present invention.

As shown in FIG. 9, the computation is carried out such that a correction amount that can achieve a smallest shifting distance from the skin color average value to the skin color region (A) is obtained. That is, when setting the coordinates of the skin color average value to (Cx1, Cy1), and setting the coordinates that are in the skin color region and are the nearest to the skin color average value (target point) to (Cx2, Cy2), the correction amounts are as follows.

$\Delta Cx = Cx2 - Cx1$ $\Delta Cy = Cy2 - Cy1$

These correction amounts ($\Delta Cx$, $\Delta Cy$) are set as the second WB correction values.

The coordinates of the target point are set such that the shifting distance from the skin color average value to skin color region (A) is the shortest because, for example, even when the correction by the second WB correction value is carried out excessively, control is carried out to achieve a position within the correct skin color region. Therefore, the target point may be set within skin color region (A).

Furthermore, the WB control unit 103 in this embodiment preferably computes, as a correction gain computation means, a correction gain for lowering the second WB correction value (S206). Examples of the correction gain are illustrated using FIG. 10A to FIG. 10E. The correction gain is computed in order to reduce excessive correction and erroneous correction due to applying the second WB correction value when accuracy in detecting a face region, that is, reliability of information obtained from the face region, is low. In this embodiment, the WB control unit 103 computes the correction gain in view of accountability of the face region information (for example, reliability and the size of the face), luminance of the photographic subject at image capture time, and photographic sensitivity. In this embodiment, the upper limit value of all the correction gains is set to 1.

Figure 10A:
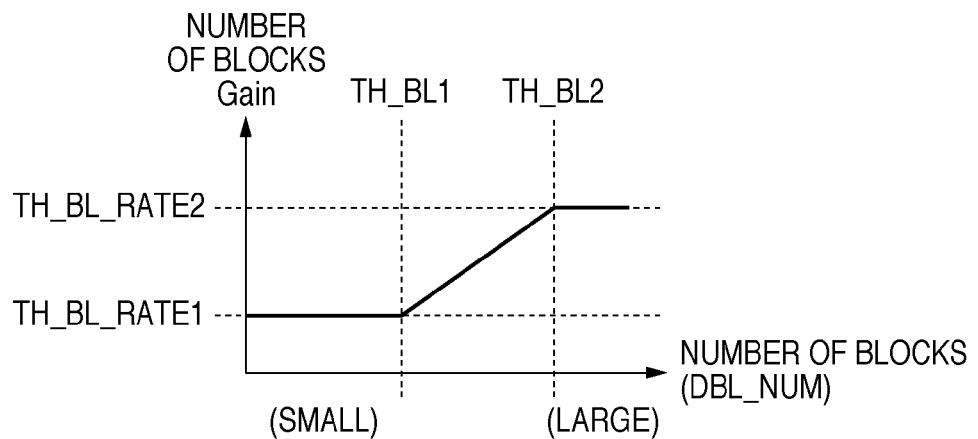
FIG. 10A to FIG. 10E are diagrams illustrating an example of a correction gain for limiting the correction amount based on the second white balance correction value in the first embodiment of the present invention.

FIG. 10A shows a gain (block number gain) based on the obtained number of the blocks corresponding to the face region. When the number of the blocks corresponding to the face region is small (small face region), the gain is set low because the accuracy as the evaluation value of skin color may be low. On the other hand, when the number of the blocks is large, because the accuracy as the evaluation value of skin color is considered to be high (high reliability), the gain is set high.

Figure 10B:
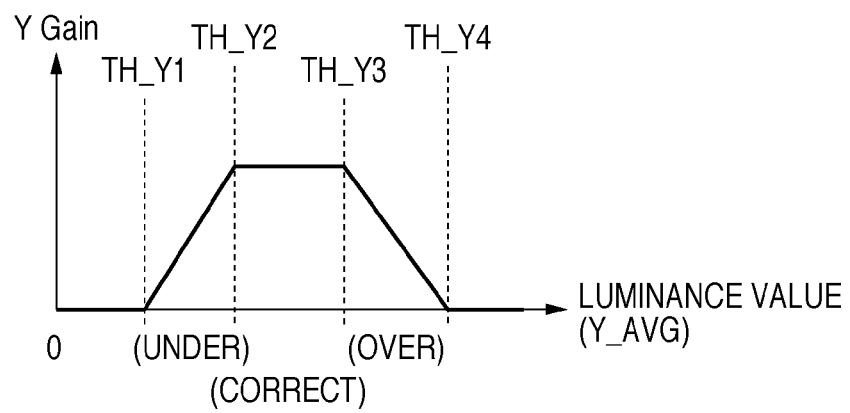

FIG. 10B shows a gain (Y gain) based on face region luminance value, and when the luminance value of the face region is low (for example, when the face region is underexposed), or high (for example, when the face region is overexposed), the gain is reduced because it may possibly be inaccurate as a skin color evaluation value. The correct exposure region in the figure is from TH_Y 2 to TH_Y 3.

Figure 10C:
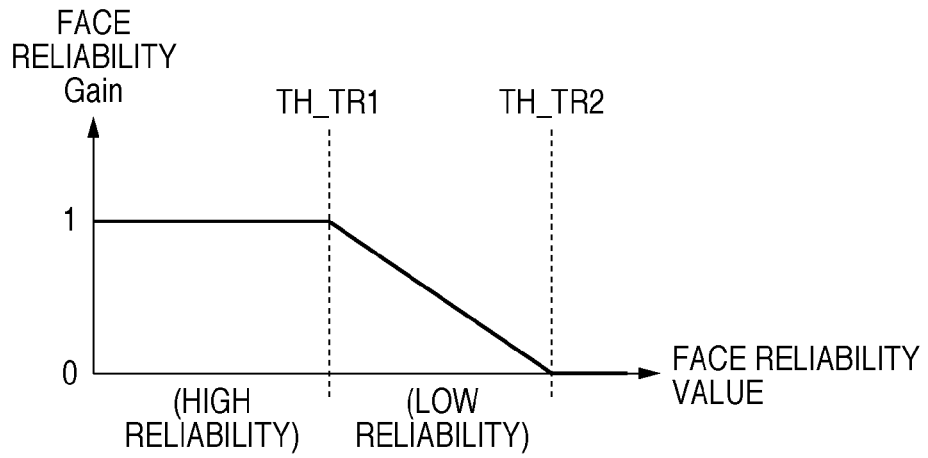

FIG. 10C shows a gain (face reliability gain) based on face detection reliability. The gain is reduced when it is judged that the face reliability is low based on the degree of correlation in the pattern matching obtained at the time of the face detection processing in the face detection unit 114 and on face detection reliability information such as the size of the face region.

Figure 10D:
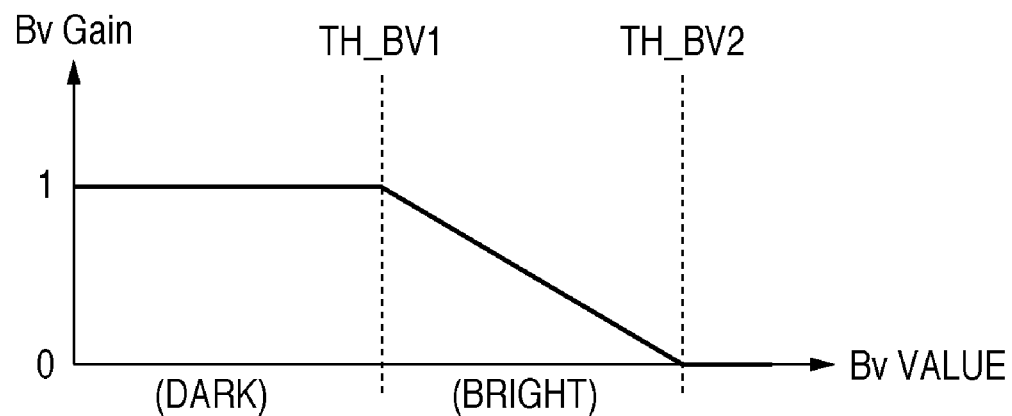

FIG. 10D shows a gain (BV gain) based on a photographic subject luminance value (Bv value). When the photographic subject luminance, that is, luminance of the entire image, is high, the light source can be easily estimated, and therefore it is highly possible that the appropriate skin region is achieved based on the first WB correction value. Thus, it can be considered that the white balance correction by the face detection is probably unnecessary when the photographic subject luminance is high. Therefore, the gain is reduced, since it is more effective in lowering adverse effects in the case when erroneous face detection occurred.

Figure 10E:
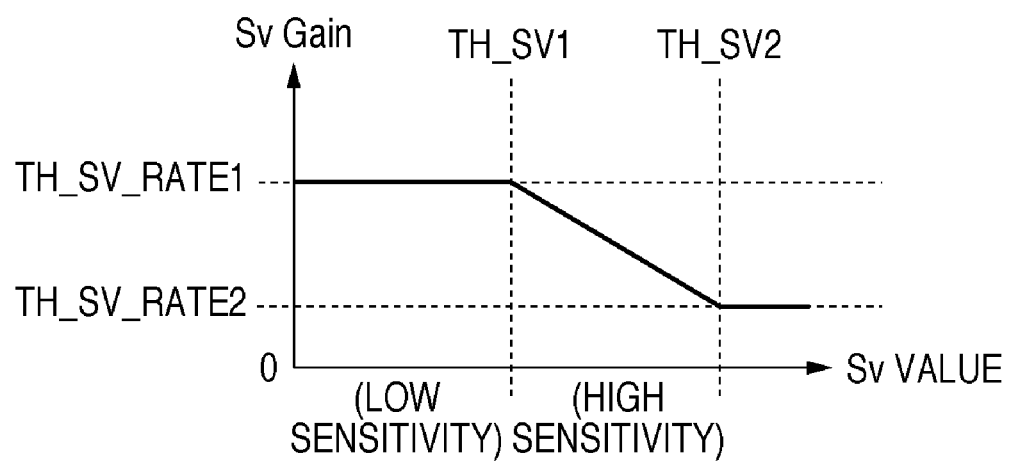

FIG. 10E shows a gain (SV gain) based on photographic sensitivity (Sv value). When the photographic sensitivity is high, noise in the image increases, and therefore erroneous face detection is highly possible, and accuracy in skin color evaluation value is reduced. Thus, the gain is reduced in the high sensitivity area.

The WB control unit 103 computes an ultimate correction gain by using one or more of these gain settings (S206).

Then, the WB control unit 103 calculates WB correction values (Gain×ΔCx, Gain×ΔCy) to achieve face region skin color average values (Cx',Cy') using the product of the second WB correction value and the correction gain as the final skin color target point (S207).

$Cx' = Gain \times \Delta Cx + Cx1$ $Cy' = Gain \times \Delta Cy + Cy1$

In this way, the sum of the second WB correction value corrected by the correction gain and the first WB correction value is determined as the WB correction value to be ultimately used in the WB control unit 103 (S208). When the correction gain is not computed, the sum of the (not corrected) second WB correction value and the first WB correction value may be determined as the WB correction value to be ultimately used in the WB control unit 103.

Then, the WB control unit 103 carries out the white balance control by using the thus determined WB correction value.

As described above, according to this embodiment, first, the first WB correction value using information on the whole image is applied to the color average value of the detected face region, and when the result of the correction is correct, the first WB correction value is used. That is, by using the result of the face detection, accuracy of the first WB correction value using information on the whole image is evaluated, and when it is determined that the accuracy is sufficient, the first WB correction value is used.

Thus, because the white balance computed without excluding the face region can be used as long as it is appropriate, white balance control that is more accurate than in the case where the face region is excluded can be realized. Furthermore, because the detection results of the face region can be used, accuracy of the first WB correction value can be evaluated more properly.

Furthermore, according to this embodiment, when correction could not be carried out using the first WB correction value, the second WB correction value to reduce the difference is computed, and the first and second WB correction values are used, as long as the difference from the proper correction result is within a certain region.

Therefore, it is possible to realize white balance control that is more accurate than in the case where only the WB correction value computed based on information on the whole image is used.

Furthermore, according to this embodiment, because the size of the second WB correction value is modified based on reliability of information obtained from the face region, excessive correction and erroneous correction due to erroneous detection of the face region can be reduced.

Furthermore, according to this embodiment, when the difference between the correction result by the first WB correction value and the proper correction result is not within a certain region, detection accuracy (reliability) of the face region is considered low, and the first WB correction value is used. Thus, excessive correction and erroneous correction due to erroneous detection of the face region can be reduced in this case as well.

Additionally, because the first WB correction value is also used when the face detection was not achieved, white balance control can be carried out.

Second Embodiment

In the first embodiment, the skin color evaluation value (skin color average value) is obtained based on the result of applying the first WB correction value to the face region, and the second WB correction value is computed when the difference between the color evaluation value and the skin color region is within a certain region.

In contrast, in this embodiment, the second WB correction value is computed based on a distance between coordinates of skin color average values in a certain color space coordinate system, and predetermined coordinates within the skin color region, that is, a distance with respect to the central coordinate corresponding to a color most preferable as the skin color.

The functional configuration of an image-capturing apparatus to which a white balance control device according to this embodiment can be applied may be the same as that of the first embodiment, and therefore the detailed description of each functional block is omitted.

Figure 11:
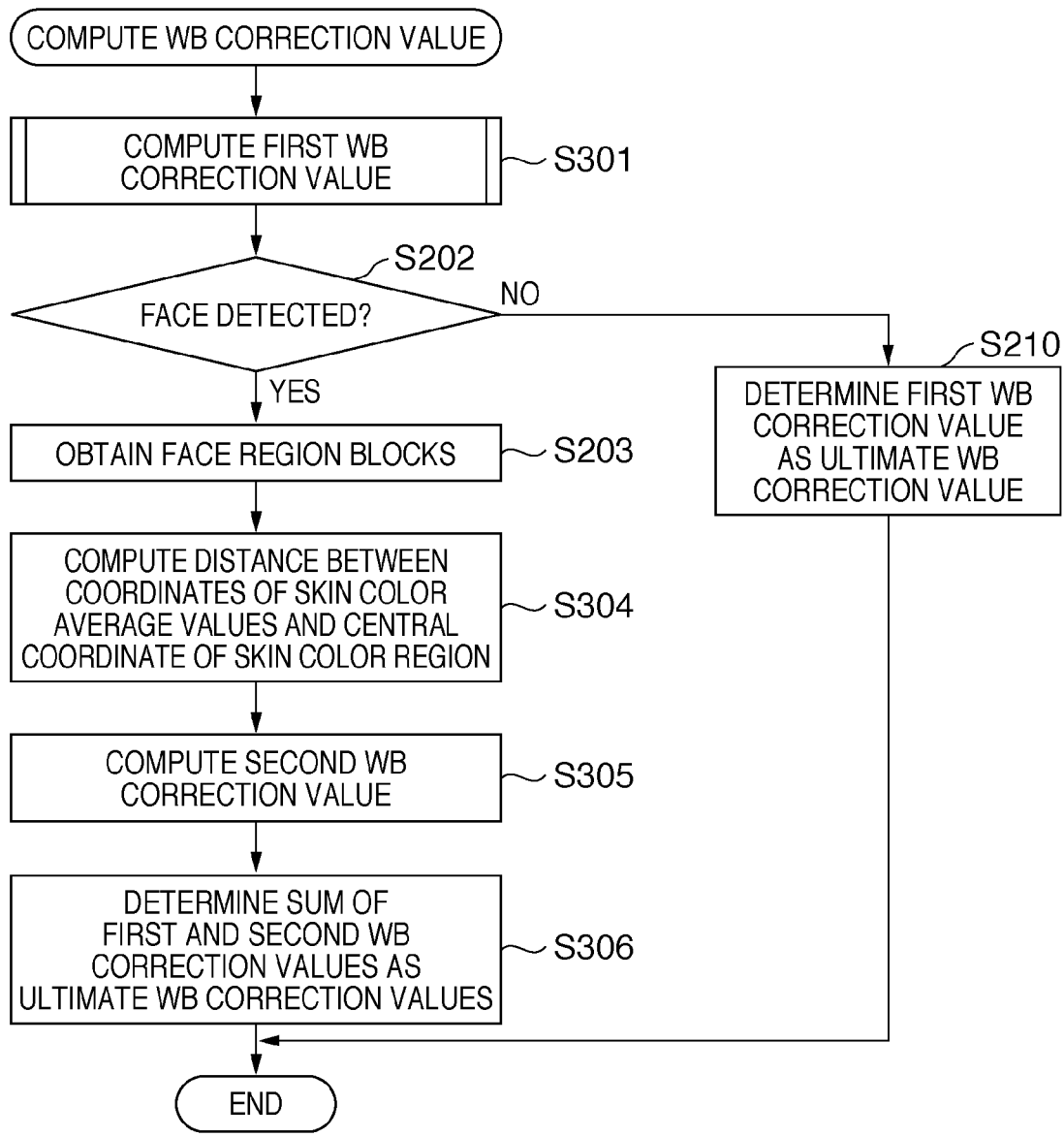
FIG. 11 is a flowchart illustrating a computing operation of the white balance correction value carried out by the white balance control unit 103 according to a second embodiment of the present invention.

FIG. 11 is a flowchart illustrating WB correction value computation processing carried out by a WB control unit 103 of an image-capturing apparatus according to this embodiment.

In FIG. 11, processes that are the same as those in FIG. 7 have the same reference numerals.

In S301, the WB control unit 103 carries out processes that are the same as those in S101 to S106 of FIG. 6, and computes a first WB correction value.

In S202, the WB control unit 103 determines whether or not the face detection unit 114 has detected a face (face region). When a face is not detected, it is determined that the already computed first WB correction value is the ultimate WB correction value (S210), and the WB correction value computation processing is terminated.

On the other hand, when a face is detected, the WB control unit 103 obtains, in S203, color average values (FR, FG, FB) of the whole blocks corresponding to the face region.

Then, in S304, the WB control unit 103 obtains skin color average values (Cx1, Cy1) by multiplying the color average values (FR, FG, FB) obtained in S203 by the first WB correction values (WBCol_R, WBCol_G, WBCol_B), respectively. The skin color average value is the color average value of the face region corrected by the first WB correction value, that is, correction image signal data.

Then, the WB control unit 103 computes a distance between the coordinates of the predetermined skin color central value and coordinates of the skin color average values (Cx1, Cy1).

Figure 12:
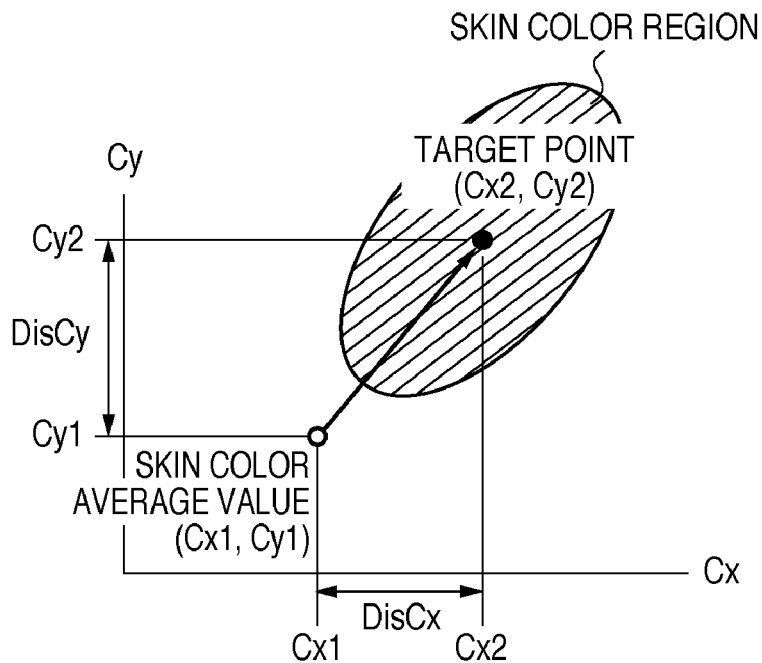
FIG. 12 is a diagram illustrating distance computation when the white balance control unit 103 according to the second embodiment of the present invention determines the second white balance correction value.

FIG. 12 is a diagram illustrating distance computation when the WB control unit 103 according to the second embodiment of the present invention determines the second WB correction value. In FIG. 12, the distance between the central coordinates (Cx2, Cy2) of the skin color region, that is, the correction target point, and skin color average values (Cx1, Cy1) is represented by a Cx component (DisCx) and Cy a component (DisCy).

In S305, the WB control unit 103 obtains a correction value based on distance DisCx and DisCy obtained in S304, and correspondence information of distance-correction values prepared in advance.

Figure 13:
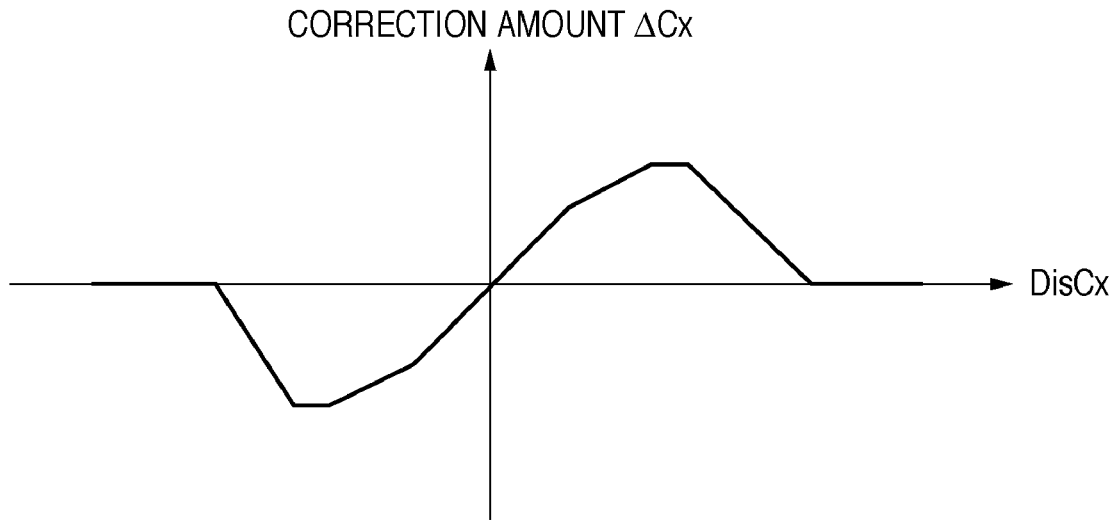
FIG. 13 is a diagram illustrating an example of correspondence information of a distance-correction value contained in the white balance control unit 103 according to the second embodiment of the present invention.

FIG. 13 is a diagram illustrating an example of correspondence information of distance-correction value contained in the WB control unit 103.

Figure 14:
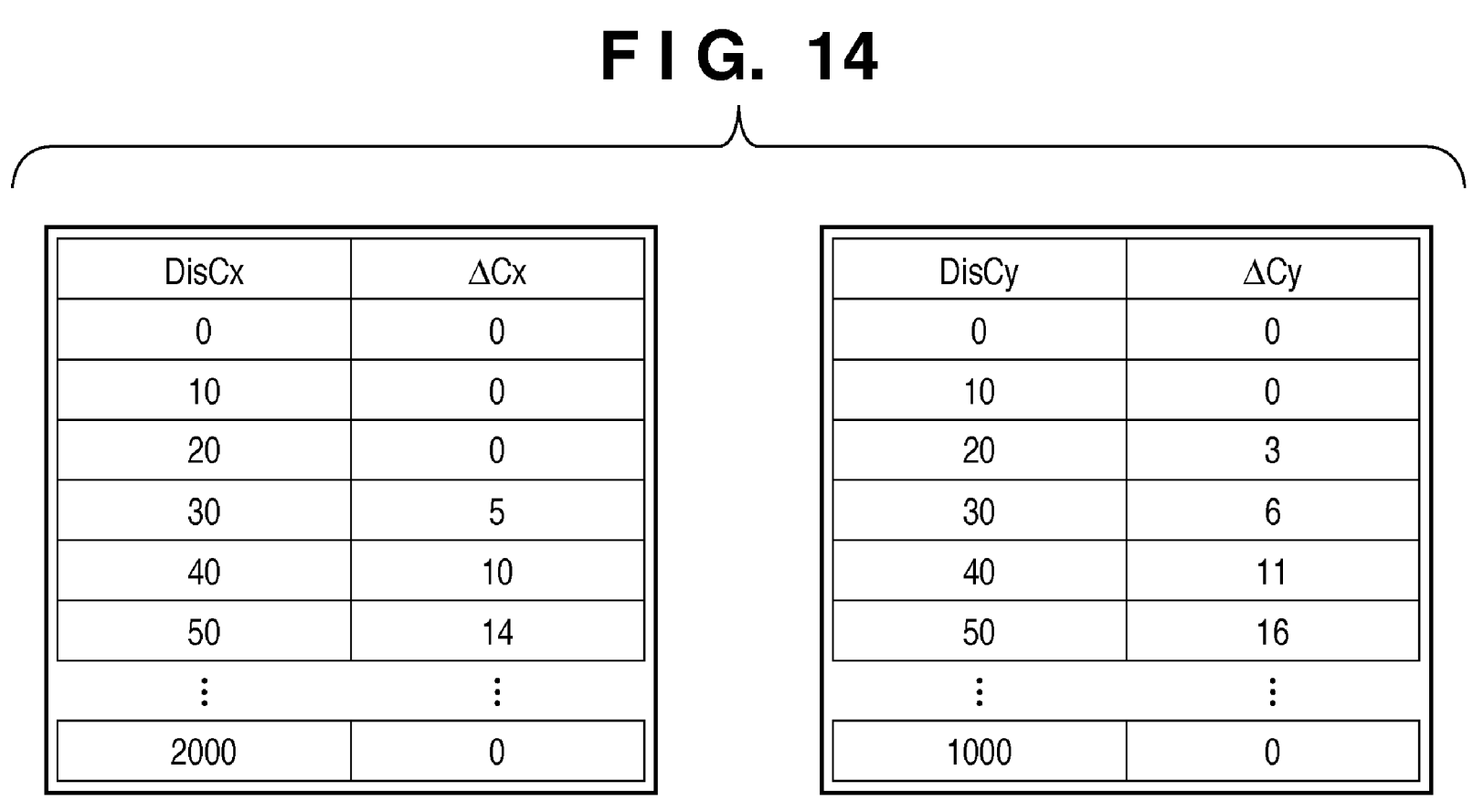

Here, correspondences between distance DisCx of the Cx component and correction value ΔCx of the Cx component are shown in a two-dimensional graph. In actuality, a function formula representing these correlations may be stored, or representative correspondences between distances and correction values may be stored as a look up table shown in FIG. 14, and other values may be obtained by interpolation.

Similarly, the Cy component can also be obtained by using correspondence information between the distance DisCx of the Cx component and the correction value ΔCx of the Cx component.

Then, in S306, the WB control unit 103 determines the sum of the first and second WB correction values as the ultimate WB correction value.

As in the first embodiment, computation of correction gains and correction of the second WB correction values by the correction gain may be carried out between S305 and S306.

According to this embodiment, effects similar to those of the first embodiment can be realized through a simpler method than that of the first embodiment.

Other Embodiment

Although an image-capturing apparatus to which a white balance control device applied was described in aforementioned embodiments, a white balance control device according to the present invention can be applied not only to image-capturing apparatuses but also to other arbitrary image processing apparatuses, as long as those apparatuses are capable of obtaining face detection information and image data.

Furthermore, the aforementioned embodiments can also be realized with software by a computer (or CPU, MPU, etc.) of a system or a device.

Therefore, the computer program itself installed in a computer to implement the aforementioned embodiments implements the present invention. That is, the scope of the present invention includes the computer program itself for implementing the function of the aforementioned embodiment.

Note that the computer program for realizing the aforementioned embodiments may be in any form as long as the program can be read by a computer. For example, the program can be configured using object code, a program executed by an interpreter, configured using script data and the like supplied to an OS, and so on, but is not intended to be limited thereto.

The computer program for implementing the aforementioned embodiments is supplied to a computer via a storage medium or hard-wired/wireless communication. A flexible disk, a hard disk, a magnetic storage medium such as magnetic tape, an optical/magneto-optical storage medium such as an MO, CD, and a DVD, a non-volatile semiconductor memory, and the like are examples of storage media that can be used to supply the program.

A method that utilizes a server on a computer network can be given as an example of a method for supplying the computer program using hard-wired/wireless communication. In this case, a data file (program file) that embodies the computer program that realizes the present invention is stored in the server. The program file may be an executable file, or may be source code.

The program can be supplied to a client computer that accesses the server by downloading the program file from the server. In this case, the program file can be divided into a plurality of segment files, and the segment files may be distributed among different servers.

In other words, a server device that supplies the program file for realizing the aforementioned embodiments to a client computer also falls within the scope of the present invention.

Furthermore, the computer program for realizing the aforementioned embodiments may be encrypted and stored in a storage medium, which is then distributed; key information for decrypting the file may be supplied to users who satisfy a predetermined condition, thereby allowing those users to install the program in their computers. The key information can be supplied by, for example, allowing the key information to be downloaded from a homepage via the Internet.

Furthermore, the computer program for realizing the aforementioned embodiments may make use of the functions of an OS already running on the computer.

Further still, the computer program for realizing the aforementioned embodiments may be partially configured of firmware for an expansion board or the like attached to the computer or may be executed by a CPU provided in that expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-337664, filed on Dec. 27, 2007, which is hereby incorporated by reference herein its entirety.

What is claimed is:

1. A white balance control device that controls the white balance of an image obtained by image-capturing, the device comprising:
    a first computing unit that computes a first white balance correction value by detecting white pixels from the image;
    a face detection unit that detects a face region from the image;
    a determination unit that determines, after the white balance of an image signal in the face region detected by the face detection unit is corrected based on the first white balance correction value, whether the corrected image signal in the face region falls into a second color signal region surrounding a first color signal region representing a skin color;
    a second computing unit that computes, if the determination unit determines that the corrected image signal falls into the second color signal region, a second white balance correction value for correcting the white balance of the image based on a relationship between the corrected image signal of the face region and the first color signal region; and
    a modification unit that modifies, according to information obtained when the image was captured, the second white balance correction value computed by the second computing unit.

2. The white balance control device according to claim 1, further comprising a white balance correction unit that carries out a white balance correction of the image,
    wherein if the determination unit determines that the corrected image signal falls into the second color signal region, the white balance correction unit carries out white balance correction of the image using the modified second white balance correction value, and if the determination unit determines that the corrected image signal does not fall into the second color signal region, the white balance correction unit carries out white balance correction of the image using the first white balance correction value.

3. The white balance control device according to claim 1, wherein the information obtained when the image was captured includes at least one of the size of the face region, the luminance value of the face region, the detection accuracy of the face region, the luminance value of the photographic subject, and the photographic sensitivity.

4. The white balance control device according to claim 1, wherein the second computing unit corrects the image signal in the face region so that the corrected image signal falls into the first color signal region.

5. The white balance control device according to claim 1, wherein the second computing unit computes the second white balance correction value for correcting the image based on a relationship between the corrected image signal in the face region and one point in the first color signal region.

6. The white balance control device according to claim 1, wherein the first computing unit detects the white pixel of the image by a predetermined block unit, and the determination unit carries out the determination on the predetermined block units of the image signal of the face region.

7. A white balance control method for controlling white balance of an image obtained by image-capturing, the method comprising:
    a first computing step of computing a first white balance correction value by detecting white pixels from the image;
    a face detection step of detecting a face region from the image;
    a determination step of determining, after the white balance of an image signal in the face region detected in the face detection step is corrected based on the first white balance correction value, whether the corrected image signal in the face region falls into a second color signal region surrounding a first color signal region that represents a skin color;
    a second computing step of computing, if it is determined in the determination step that the corrected image signal falls into the second color signal region, a second white balance correction value for correcting the image based on relationships between the corrected image signal in the face region and the first color signal region; and
    a modification step of modifying, according to information obtained when the image was captured, the second white balance correction value computed in the second computing step.

8. A non-transitory computer-readable medium storing a program that causes a computer to function as the unit of the white balance control device according to claim 1.

* * * * *